Patented Aug. 1, 1950

2,516,960

UNITED STATES PATENT OFFICE 2,516,960

ETHYLENE-ALKYLENE OXIDE COPOLYMERS

Donald D. Coffman, Wilmington, Del., assignor to E. I. du Pont de Nemours & Company, Wilmington, Del., a corporation of Delaware No Drawing. Application August 19, 1948, Serial No. 45,214

6 Claims. (Cl. 260—88.1)

This invention relates to new and useful polymeric materials, and more particularly to certain new copolymers of ethylene.

Ethylene polymers, which are described in U. S. Patent 2,153,553 and elsewhere, have assumed considerable technical importance. For some uses, however, these polymers have the disadvantage of low solubility at ordinary temperature, particularly in hydrocarbon solvents.

This invention has as an object a new and useful polymeric material. A further object is a new copolymer of ethylene which has the economical advantages of the ethylene polymers, and which in addition has desirable solubility characteristics not possessed by the ethylene polymer. A still further object is a method for making these copolymers. Other objects will appear hereinafter.

The new polymeric materials described herein are copolymers of ethylene with a 1,2-alkylene oxide which contains from two to four carbon atoms. These copolymers can be obtained by polymerizing a mixture of ethylene with the 1,2-alkylene oxide at elevated temperatures and pressures. Although the present copolymers can be obtained without the aid of an added catalyst, it is preferred for reasons appearing hereinafter to use certain selected catalysts of which the preferred ones are the azines, i. e. the symmetrical condensation products of aldehydes or ketones with hydrazine.

In the preferred mode of preparing the polymers of this invention, the 1,2-alkylene oxide is placed in a pressure vessel together with between 0.05–2%, by weight, of an azine catalyst, e. g., benzalazine. The reactor is then pressured with ethylene, heated to 200–250° C. and maintained at that temperature with agitation for a period of about 2 to 16 hours, the pressure being maintained within the range of 350–1000 atmospheres by intermittent admission of ethylene. The reaction products are solids varying in consistency from soft greases to relatively hard waxes. If desired, they may be subjected to an aqueous extraction treatment which removes the small amounts of alkylene oxide homopolymer which may be present.

The invention is further illustrated in the following examples in which parts are by weight.

Example I

A silver-lined pressure reactor was swept with nitrogen and charged with 0.2 part of benzalazine. The reactor was closed, evacuated through a valve in the closure, cooled in a carbon dioxide-acetone mixture, and further charged with 20 parts of ethylene oxide introduced through the valve. The reactor was then mounted in a reciprocal shaking mechanism and connected through the valve to a high-pressure ethylene tank. The shaker was started, the reactor was heated to 225° C., and the pressure within the reactor was maintained at 400–500 atmospheres by admitting ethylene intermittently. After 14¾ hours the reactor was cooled, and the unreacted monomers were bled off. There was obtained 28 parts of a yellow, waxy reaction product which flowed at 90° C. This copolymer contained 76.83% carbon and 13.37% hydrogen. This composition corresponds to an average ethylene: ethylene oxide mole ratio of 7.9:1.

Example II

A copolymer was prepared as in the preceding example, using 180 parts of ethylene oxide, 0.2 part of benzalazine, an ethylene pressure of 700–800 atmospheres, and a reaction temperature of 250° C. There was obtained 130 parts of a soft paste, the volatile portion of which was removed by distillation at 150° C. and 5 mm. pressure. This volatile portion was identified as a mixture of ethylene oxide, acetaldehyde and ethylene glycol.

The residue (70 parts) was dissolved in 300 parts of benzene, and the solution was extracted with water until the extract was colorless. The water-soluble portion consisted of 10 parts of polyethylene oxide with an average molecular weight of 250. The benzene solution gave on evaporation of the solvent 44.5 parts of a copolymer of average molecular weight 750 and containing 80.92% carbon and 13.15% hydrogen. This composition corresponds to an average ethylene:ethylene oxide mole ratio of 8.3:1. The product was hard and waxy.

The polymer from the benzene solution was redissolved in benzene and again extracted with water. The water extract contained only 0.2 part of solid, indicating substantially complete removal of water-soluble components. The benzene solution was evaporated, and 36 parts of the residual polymer was stirred with 200 parts of ethanol. The alcohol-soluble fraction (8.6 parts) was a polymer containing 75.47% carbon and 11.92% hydrogen. This composition corresponds to an average ethylene:ethylene oxide mole ratio of 3.2:1. The alcohol-insoluble fraction (25.5 parts) was a polymer containing 83.21% carbon and 14.09% hydrogen. This corresponds to an average ethylene:ethylene oxide mol ratio of 18:1.

Example III

A silver-lined reactor was swept with nitrogen and charged with 10 parts of sodium bicarbonate. The reactor was evacuated, charged with 40 parts of ethylene oxide, heated to 225° C., and pressured to 350–600 atmospheres with ethylene. After 14 hours' reaction time, the product was found to consist of 210 parts of a tacky, wax-like polymer. After extraction with boiling water, the residual polymer (about 180 parts) contained 79.04% carbon and 13.46% hydrogen. This composition corresponds to an average ethylene:ethylene oxide mole ratio of 5.7:1. The average molecular weight of this polymer was 1900.

In an investigation of the structure of the ethylene/alkylene oxide copolymers, 50 parts of a material prepared as just described (except that the reaction temperature was 250° C.) was placed in a silver-lined pressure reactor together with 195 parts of a 38% solution of hydrogen bromide in acetic acid. The reactor was heated at 130° C. for 10 hours, and the reaction mixture was steam distilled. The volatile portion, upon being fractionated, was found to consist of 32 parts of ethylene bromide and of 5 parts of a liquid boiling at about 210° C., whose composition corresponded approximately to the formula $C_5H_{11}Br_2$. The non-volatile product remaining after the steam distillation was freed of water by evaporation under reduced pressure. It was a solid polymer having an average molecular weight of 1180 and containing 79.85% carbon, 13.25% hydrogen, 5.64% bromine and 1.26% oxygen (by difference). The low oxygen content indicated that most of the ether linkages in the original polymer had been cleaved by the hydrogen bromide treatment. Since the principal cleavage product was ethylene bromide, it may be inferred that most of the ethylene oxide units are contiguous in the copolymer.

The ethylene oxide mentioned in the above examples can be replaced by any of the 1,2-alkylene oxides having from 2 to 4 carbon atoms, namely, 1,2-propylene oxide, 1,2-butylene oxide or isobutylene oxide. The ethylene may, if desired, be specially purified and deoxygenated, but ethylene having the normal amount of oxygen between about 0.03 and 1% is satisfactory. The present copolymers preferably consist of or consist essentially of the polymerization product of the ethylene and alkylene oxide. However, certain other polymerizable materials in amount up to 25% by weight of the ethylene and alkylene oxide polymerized can be present in the reaction mixture.

The reaction temperature should be at least 200° C. since it has been observed that, at lower temperatures, the reaction product is polymerized ethylene rather than a copolymer, even in the presence of an active catalyst. The temperature can be as high as the decomposition point of the reactants, e. g., up to 300° C. or even higher, but the preferred range is 200–250° C. The reaction pressure need not be as high as that frequently used to form ethylene homopolymers, since the reaction proceeds at pressures as low as 300 atmospheres. The pressure can be as high as the equipment can withstand, e. g. up to 3000 atmospheres or more, the preferred range being within 350–1000 atmospheres.

The catalysts most useful for preparing the copolymers of this invention are, as was previously mentioned, the azines, i. e. the symmetrical condensation products of aldehydes or ketones with hydrazine having the general formula $R_2C=N-N=CR_2$, where R is hydrogen and/or an alkyl, cycloalkyl, aryl or aralkyl group. These compounds are further described in U. S. Patent 2,439,528. Typical examples of azines include dimethylketazine, diphenylketazine, methylphenylketazine, dicyclohexylketazine, acetalazine, benzalazine, naphthalazine and the like. The azine catalyst is generally used in amounts ranging between 0.001% to about 5% by weight of the total monomers, and preferably between 0.05 and 2%. In addition to the azines, it has been observed that alkali metal bicarbonates such as sodium or potassium bicarbonate are effective in promoting the polymerization reaction, although they are not nearly as desirable as the azines because much larger quantities must be used and the reaction product is contaminated with inorganic residues. Moreover, it is possible, as has been noted previously, to copolymerize ethylene and an alkylene oxide without added catalyst, in which case the oxygen normally present in the ethylene apparently acts as the reaction promoter. It is of interest to note that the usual peroxygen catalysts such as benzoyl peroxide, di-tertiary butyl peroxide, etc., lead to ethylene homopolymers rather than to copolymers and are therefore ineffective in the process of this invention.

The reaction is preferably carried out without added solvent or reaction medium. If desired, however, an inert organic solvent, preferably an aliphatically saturated hydrocarbon such as n-hexane, toluene or decahydronaphthalene, may be used.

While it is not convenient or feasible to weigh accurately the ethylene used in these reactions, it can be said in general that there is used a weight ratio of ethylene to alkylene oxide between 10:1 and 1:50, the preferred range being between 5:1 and 1:2.

The reaction is usually continued until there is no appreciable drop in ethylene pressure. Within the preferred temperature and pressure range, the reaction is in general substantially complete within a period of 2 to 16 hours.

The copolymers of this invention have ethylene:alkylene oxide mole ratios varying between about 1:1 and 150:1, as calculated from their carbon and hydrogen contents. The most useful are those in which the ethylene:alkylene oxide mole ratio is between 3:1 and about 50:1. These copolymers differ from the ethylene homopolymers in that they are readily soluble at ordinary temperature in aromatic hydrocarbons, and particularly in toluene. They are also soluble, though more sparingly, in aliphatic hydrocarbons, e. g. lubricating oils, in chlorinated solvents such as chloroform or carbon tetrachloride, and in other solvents such as alcohol or acetone. They differ from the alkylene oxide homopolymers, on the other hand, in that they are insoluble in water. These products are not "telomers" of ethylene (see U. S. Patent 2,402,137). On the basis of the available chemical evidence, they are rather copolymerization products, and they have the peculiarity that a number of alkylene oxide units are joined together rather than being wholly interspersed heterogeneously among ethylene units. The molecular weight of these copolymers varies in general between about 500 and about 10,000.

The ethylene/alkylene oxide copolymers of this invention are useful in many technical applications, for example as additives for lubricating oils, ingredients of waxes and polishes, coating compositions for fibrous materials such as textiles or paper, ingredients of impregnating compositions, antistatic agents, etc.

As many apparently widely different embodiments of this invention may be made without departing from the spirit and scope thereof, it is to be understood that this invention is not limited to the specific embodiments thereof except as defined in the appended claims.

I claim:

1. A copolymer of ethylene and a 1,2-alkylene oxide in which the ethylene:alkylene oxide mole ratio is from 3:1 to 50:1, said alkylene oxide having from 2 to 4 carbons.

2. A copolymer of ethylene and ethylene oxide in which the ethylene:ethylene oxide mole ratio is from 3:1 to 50:1.

3. A process for obtaining copolymers of ethylene which comprises heating, in contact with an azine polymerization catalyst at 200° C. to 300° C. and under a pressure of at least 300 atmospheres, a mixture of ethylene with a 1,2-alkylene oxide having from 2 to 4 carbon atoms, said mixture containing the ethylene and alkylene oxide in a proportion yielding a copolymer in which the ethylene:alkylene oxide mole ratio is from 3:1 to 50:1, said azine polymerization catalyst being a compound of the general formula $$R_2C=N-N=CR_2$$

in which R is selected from the group consisting of hydrogen, alkyl, cycloalkyl, aryl and aralkyl groups.

4. The process set forth in claim 3 in which said azine catalyst is benzalazine.

5. The process set forth in claim 3 in which said 1,2-alkylene oxide is ethylene oxide.

6. The process set forth in claim 5 in which said azine catalyst is benzalazine.

DONALD D. COFFMAN.

REFERENCES CITED

The following references are of record in the file of this patent:

UNITED STATES PATENTS

| Number | Name | Date |
|---|---|---|
| 2,394,862 | Loder | Feb. 12, 1946 |
| 2,439,528 | Roedel | Apr. 13, 1948 |